United States Patent [19]

Bauer

[11] Patent Number: 5,410,008
[45] Date of Patent: Apr. 25, 1995

[54] PROCESS OF PREPARING POLYOL-CONTAINING DISPERSIONS AND THEIR USE

[75] Inventor: Gunter Bauer, Aalen, Germany

[73] Assignee: Pebra GmbH Paul Bruan, Altbach, Germany

[21] Appl. No.: 972,464

[22] PCT Filed: Jul. 31, 1991

[86] PCT No.: PCT/DE91/00622
§ 371 Date: Nov. 1, 1993
§ 102(e) Date: Nov. 1, 1993

[87] PCT Pub. No.: WO92/02576
PCT Pub. Date: Feb. 20, 1992

[30] Foreign Application Priority Data

Aug. 2, 1990 [DE] Germany ............... 40 24 601.9

[51] Int. Cl.$^6$ ............... B01J 13/00; C08G 18/10; C08G 18/32; C09K 3/00
[52] U.S. Cl. ............... 528/61; 252/182.24; 252/182.25; 252/182.26; 252/308; 252/309; 521/174; 528/60; 528/64
[58] Field of Search ............... 252/182.24, 182.25, 252/182.26, 308, 309; 588/218; 521/49.5, 912; 528/64, 61

[56] References Cited

U.S. PATENT DOCUMENTS

| 3,109,824 | 11/1963 | Heiss ............... 521/53 |
| 3,325,421 | 6/1967 | Muller ............... 252/308 |
| 3,404,103 | 10/1968 | Matsudaira et al. ............... 521/49.5 |
| 3,738,946 | 6/1973 | Frulla et al. ............... 521/49.5 |
| 3,832,323 | 8/1974 | Ramey et al. ............... 252/182.26 X |
| 3,983,087 | 9/1976 | Tucker et al. ............... 521/49.5 |
| 4,451,583 | 5/1984 | Chesler ............... 521/49.5 |
| 4,518,521 | 5/1985 | Heusch et al. ............... 252/182.25 X |
| 4,530,941 | 7/1985 | Turner et al. ............... 521/176 |
| 5,274,004 | 12/1993 | van der Wal ............... 252/182.26 X |

FOREIGN PATENT DOCUMENTS

| 0141525 | 5/1980 | German Dem. Rep. ............... 521/49.5 |
| 2516863 | 10/1975 | Germany . |
| 2557172 | 8/1978 | Germany . |
| 141525 | 1/1979 | Germany . |
| 2738572 | 11/1979 | Germany . |
| 2902509 | 7/1980 | Germany . |
| 3702495 | 6/1989 | Germany . |
| 3818770 | 12/1989 | Germany . |

*Primary Examiner*—Richard D. Lovering
*Attorney, Agent, or Firm*—Browdy and Neimark

[57] ABSTRACT

This invention relates to a process for preparing polyol-containing dispersions by reacting polyurethane-urea waste with at least one linear and/or branched-chain diol and/or polyol with a mol mass of 50–1000 g/mol in a ratio by weight of polymer waste to diol and/or polyol of greater than 3:1 at a temperature of 150°–250° C., optionally in the presence of acid or basic catalysts, and by dispersing the reaction product in at least one primary polyol with a mol mass up to about 6000 g/mol.

The resultant dispersions are suitable for the preparation of polyurethanes or polyurethane-ureas.

18 Claims, No Drawings

PROCESS OF PREPARING POLYOL-CONTAINING DISPERSIONS AND THEIR USE

FIELD OF THE INVENTION

This invention relates to a process for preparing polyol-containing dispersions by alcoholyzing polyurethane-urea waste and to the use of these dispersions for preparing new polyurethane-ureas.

BACKGROUND OF THE INVENTION

It is already known that polyurethane (PUR) and polyureas (PU), in particular foams, can be converted by alcoholic decomposition into homogeneous polyol-containing liquids which are directly suited for making rigid foams of PUR. Various types have become known in this field, the following publications being here cited by way of example:

DE-OS 25 16 863, U.S. Pat. No. 3,109,824, U.S. Pat. No. 3,404,103, DE-OS 25 57 172, DE-PS 27 38 572 or DE-PS 37 02 495.

The known processes have in common that alcoholysis is carried out with a considerable excess of diols or polyols to decompose the polyurethanes to such a degree that homogeneous polyol mixtures are obtained whose viscosity is low enough to reuse them directly or in homogeneous mixtures with short-chain polyols for making rigid polyurethanes. Therefore, all of the products obtained in these methods have a high hydroxyl equivalent which limits their application to the production of rigid polyurethanes. The methods mainly differ from each other by special reaction conditions, catalysts and process techniques.

Products which are suited for the manufacture of flexible to semirigid foams with respect to their viscosities and hydroxyl equivalents could so far not be recovered from polyurethanes and polyureas by alcoholic decomposition. Likewise, products which can be reused for the renewed preparation of polyurethane-ureas could so far not be recovered from polyurethane-ureas by alcoholic decomposition. In particular, a practicable method which serves to decompose RIM (reaction-injection-molding) or R-RIM (reinforced-reaction-injection-molding) parts based on polyurethane-ureas used on a large scale in the automotive industry and which yields reusable products has so far not become known.

SUMMARY OF THE INVENTION

It is therefore the object of the present invention to provide a process for decomposing polyurethane-urea waste, whereby polyol-containing products which are especially suited for the renewed preparation of polyurethane-ureas can be obtained through a simple alcoholysis reaction.

In accordance with the invention this object is accomplished through a process for preparing polyol-containing dispersions by reacting polyurethane-urea waste with at least one linear and/or branched-chain diol and/or polyol with a mol mass of 50–1000 g/mol in a ratio by weight of polymer waste to diol and/or polyol of greater than 3:1 at a temperature of 150°–250° C., optionally in the presence of acid or basic catalysts, and by dispersing the reaction product in at least one primary polyol with a mol mass up to about 6000 g/mol.

Primary polyols are polyols or polyol mixtures which are used for preparing polyurethanes and polyurethane-ureas.

Surprisingly enough, it has been found that polyurethane-ureas can be decomposed in the process of the invention by using small diol and/or polyol amounts. This yields viscous products which can also be dispersed in any desired ratio in high-molecular polyols (primary polyols) without the application of a special force, with the resultant dispersions having a high stability at relatively low viscosities.

The different properties of the polyurethane-ureas as compared with polyurethanes become apparent in the course of the decomposition process through the fact that two-phase substance mixtures and homogeneous products are not formed in the case of polyurethane-ureas, but milky turbid compositions which, however, lose their disperse character neither in this state nor when being diluted with primary polyols.

This unexpected course of the alcoholysis reaction, which only takes place when polyurethane-urea products are alcoholyzed, is normally independent of the kind of diol or polyol used for alcoholysis, but it can only be observed when, in contrast to the quantitative ratios of up to about 3:1 which have so far been normal in the alcoholysis of polyurethanes, the ratio of polymer to di- and/or polyol is changed in favor of the polymer to be more than 3:1 in response to the respective di- or polyol used.

In the process of the invention the weight ratio of polymer waste to diol and/or polyol is preferably more than 5:1. Surprisingly enough, no substantial change in the stable disperse state is observed with even greater ratios of polymer to diol and/or polyol, e.g. more than 6:1 up to 10:1 and more. As a result, the high-viscosity reaction products obtained can be diluted with any primary polyols, also high-molecular ones, without a substantial increase in the viscosity of the primary polyols being noticed.

It follows from these properties that the alcoholysis products in their status nascendi form finely divided dispersions due to self-stabilizing effects. These dispersions are so stable that they do not coagulate when being mixed with the most different polyols and are also not separated into phases, which is rather surprising.

In accordance with the process of the invention, all waste materials and production residues can be used on the basis of urethane or urea copolymers. As a rule, these are prepared by reacting mixtures of polyether and/or polyester polyols as well as diamines and di- or polyisocyanates. The alcoholyzing process of the invention can preferably be applied to polymers made from aromatic diamines, such as diethyl toluylenediamine (DETDA), in combination with high-molecular polyether polyols with mol masses of some thousands g/mol, on the one hand, and aromatic di- or polyisocyanates based on methylene diphenyl diisocyanate on the other hand. Alcoholysis is not influenced by other additions or modifying agents.

An essential advantage of the process of the invention is that RIM and R-RIM parts can virtually be decomposed without any residues and converted into low-viscosity products of a small hydroxyl group equivalent. The RIM or R-RIM parts may be painted in any way and contain fillers or reinforcing substances. The process of the invention is especially suited for glass-fiber reinforced (R-RIM) parts because it has surprisingly be found that short glass fibers result from the reaction in almost unchanged form and remain distributed in a stable state in the obtained dispersions over long periods of time. By contrast, this unexpected effect which is especially beneficial from the point of view of application technology is not observed when glass fibers are dispersed in conventional polyols of similar viscosities. In this case, the glass fibers settle in a compact layer on the bottom of the vessel, which makes transportation and storage of the glass-fiber filled liquid product much more difficult from a technical point of view. As far as glass-fiber distribution is concerned, the stabilizing effect of the alcoholysis product as obtained in the process of the invention is not clear. It is assumed that the dispersed-particles from the alcoholysis products prevent the short glass fibers from depositing. The process of the invention is thus of special importance to the alcoholysis of RIM rejects or waste materials. Hence, it has been possible with the process of the invention for the first time to decompose such waste by alcoholysis virtually without any residues and to reuse the same for its original application, e.g., by returning it to the RIM or R-RIM production. As already mentioned at the outset, this was not possible with the former alcoholysis methods either because of the high hydroxyl equivalents or the heterogeneity of the alcoholysis products. The importance of the process of the invention to industry and economy is thus considerable because such waste could so far not be reused and high-quality and energy-intensive materials had therefore to be disposed off as waste.

DETAILED DESCRIPTION OF THE INVENTION

Low-molecular aliphatic diols with up to 20 carbon atoms are preferably used for a reaction in accordance with the process of the invention. Examples thereof are ethylene glycol, diethylene glycol, triethylene glycol, tetraethylene glycol, oligoethylene glycol, propylene glycol, dipropylene glycol, tripropylene glycol oligopropylene glycol, butanediols, dibutylene glycols pentanediols, 3-methylpentanediol-1,5, neopentyl glycol, hexanediols or octanediols. Mixtures of these diols with each other or with polyvalent alcohols or polymolecular polyols are also suited. It has been found that in the process of the invention polyol dispersions are formed independently of the diol or polyol used, provided that the diols and/or polyols are smaller, in weight ratios, than 1:3, preferably less than 1:5, based on the polyurethane-urea waste. The quantitative ratios may even be 1:10 or less without the character of the polyol dispersion being basically changed thereby.

In the process of the invention the diol or polyol amounts can be reduced to such an extent as is technically possible with respect to viscosity, i.e. stirring and heat exchange as well as disintegration of the PUR-PU waste are not impeded. The reaction rate rises with an increasing temperature, and also due to the action of basic or acid catalysts. The reaction of the invention is preferably carried out between 180° and 230° C. Especially effective catalysts are alkali alkoxides, hydroxides or carboxylates or Lewis acids, such as titanates, stannates or antimonates.

The reaction is advantageously carried out continuously in heatable stirring tanks and/or screw machines (extruders).

A reaction in a single-stage or two-stage stirring vessel system at temperatures of not more than 250° C. and mean retention times of 1 to 2 hours has turned out to be very ideal despite the fact, which is generally known, that a retention spectrum which is too broad for chemical reactions must theoretically be expected when one or two series-connected reaction vessels are continuously operated. In view of this fact, of which a process engineer is aware, it could not be foreseen that under the given reaction conditions the second reaction vessel discharges a product which is free of unreacted components and has the same physical and chemical properties as a product obtained under the same conditions in a discontinuous batch operation.

It should be emphasized that coarsely or finely comminuted RIM or R-RIM waste can be supplied to the first reaction vessel without a disturbance of the continuous reaction sequence or an impairment of the production properties having to be feared.

In this embodiment glass-fiber reinforced (R-RIM) products can also be alcoholyzed in accordance with the invention. Surprisingly enough, it has been found that the application of this gentle stirring vessel method yields glass fibers in an almost undamaged state and in disperse form after the reaction.

Although the alcoholyzed polymer waste, in particular RIM and R-RIM waste, are flowable under heat, they must be diluted with primary polyols for applications at normal temperatures. Mixtures which are based on polyether and/or polyester polyols are preferably used as primary polyols. Immediately after the completion of the reaction the primary polyol is advantageously added and mixed with the reaction product, which is still in its hot state, to obtain the desired dispersion. Likewise, at least part of the primary polyol may already be present or added during the reaction. The ease of mixing and the stability of the alcoholysate dispersion of the invention also permit the addition of high-molecular polyether polyols under heat without any coagulation or phase separation being observed at specific points of the reaction course or when the product is cooled. This procedure is of special importance insofar as in the case of the reaction of glass-fiber filled polymer waste the glass fibers do not deposit in the form of a compact bottom sediment after cooling and settling of the product mixtures. This is entirely unexpected because of contrary experience with glass-fiber reinforced polyols and is of great importance to the conduction of the process with R-RIM waste in practice.

The alcoholysis products made according to the invention are characterized by low hydroxyl equivalents because of the small diol or polyol proportion during alcoholysis. In comparison with alcoholysis polyols made in accordance with previous processes, this has the advantage that the scope of application becomes substantially broader. Apart from rigid polyurethane-ureas, flexible to semirigid polyurethane-ureas can be made, depending on the kind of primary polyol with which the dispersion is mixed. For instance, if an alcoholysate is mixed with a long-chain triol having a hydroxyl number of about 30 mg KOH/g, this stable polyol dispersion is again suited for preparing R-RIM products. The free amine amount contained in the alcoholysate has per se such an accelerating effect on the reaction with isocyanates that additional amines or catalysts are normally not needed. Such polyol dispersions are therefore excellently suited as additions to primary polyols in RIM or R-RIM techniques. It is e.g. possible in this way to return production waste directly to the manufacturing process, which has so far not been possible and is therefore of considerable economic benefit and of general advantage to the environment.

Not only the direct reuse in semirigid RIM or R-RIM products is possible with the reaction products obtained according to the invention, but e.g. also the production of rigid polyurethane-ureas, especially when the alcoholysis reaction is modified. If an unsaturated carboxylic acid or the anhydride thereof, e.g. acrylic acid, is added to the reaction diol or polyol, this acid reacts with the amines and is incorporated through the double bond into the polyol dispersion. This results in polyol dispersions which behave neutral towards isocyanate with respect to reactivity. If these are, e.g., mixed with short-chain polyfunctional polyols, it is possible to make rigid products, in particular rigid polyurethane foams, with these polyol dispersions by means of standard formulations. The resultant foams exhibit excellent thermal and mechanical properties. It is thereby possible to reuse, for instance, RIM or R-RIM waste materials for the most different applications. This considerably extends and improves the marketing chances of recycling products.

The examples given hereinafter illustrate the invention.

Rejected or used bumpers and side panels of cars which had been made in accordance with the R-RIM method with isocyanates and polyol-diamine mixtures were employed in all tests. The painted and soiled parts were roughly comminuted in a cutting mill and reacted in this state.

EXAMPLE 1

40 g of diethylene glycol are fed into a 1-liter three-neck bottle equipped with a stirrer and heated to 220° C. Comminuted painted R-RIM waste is introduced into the bottle at such a rate that the temperature does not drop below 200° C. and that the mixture remains stirrable. After 360 g of waste have been added on the whole, stirring is continued at 220° C. After a total reaction time of 2 h, 360 g of a long-chain polyether triol with a mol mass of 5000 g/mol are added under stirring as a primary polyol and cooled down. This yields a disperse, milky turbid liquid with a viscosity of 9.6 Pa.s at 22° C. and a hydroxyl value of 95 mg KOH/g. No phase separation and bottom sediment could be observed even after several days of standing.

EXAMPLE 2

70 g of butanediol, 1.0 g of potassium hydroxide and 350 g of R-RIM waste are reacted at 200° C. by analogy with Example 1 and mixed with 210 g of a polyether triol with a mol mass of 5000 g/mol as primary polyol under heat after the reaction has been completed. A stable disperse liquid with a hydroxyl value of 180 mg KOH/g and a viscosity of 10.6 Pa.s at 22° C. is obtained.

EXAMPLE 3

60 g of dipropylene glycol and 80 g of a long-chain polyether triol (primary polyol) are introduced into the bottle and 150 g of R-RIM waste are added in metered amounts at 220° C. Another 150 g of waste are added while the temperature is slowly raised to 250° C. After a total reaction time of 1.5 hours the reaction product is mixed with 280 g of a long-chain polyether triol (primary polyol) like in Example 1. This results in a disperse stable liquid with a hydroxyl value of 85 mg KOH/g and a viscosity of 13 Pa.s at 22° C.

EXAMPLE 4

Like in Example 1, 350 g of R-RIM waste are added in metered amounts to 70 g of diethylene glycol at 220° C. and also 28 g of acrylic acid. After another reaction time of 45 min, 300 g of a short-chain polyether triol with a hydroxyl value of 300 mg KOH/g are added to the mixture as primary polyol, and cooling is carried out. This results in a stable dispersion with a hydroxyl value of 20 mg KOH/g and a viscosity of 6 Pa.s.

A foam with a a good porous structure and a dimensional stability was prepared with the aid of the following formulation by using the dispersion prepared in the above way:

60 g dispersion
2 g silicone surfactant
0.3 g dimethyl cyclohexylamine
0.5 g potassium acetate
2 g $H_2O$
10 g trichlorofluoromethane

EXAMPLE 5

An apparatus which consists of two separately heatable stirring reactors with a content of 4 l each is used for a continuous testing method.

R-RIM waste and diethylene glycol are continuously introduced into the first reactor in metered amounts in the quantitative ratio of 7:1. The second reactor communicates with the first one, with the liquid level being kept constant in both reactors through a corresponding outlet. When an amount of 4 kg/h is added, about 4 kg/h of liquid reaction product leave the second reactor at a temperature of 230° C. This reaction product is collected in a vessel and continuously mixed with a long-chain polyether polyol with the aid of a dispenser stirrer in the ratio of 1:1 and cooled. The product has the same physical and chemical properties as a discontinuously prepared product according to Example 1.

EXAMPLE 6

By analogy with Example 5, R-RIM waste, diethylene glycol and acrylic acid are continuously added in metered amounts in the quantitative ratios as indicated in Example 4 in such a way that about 5 kg/h of a disperse homogeneous product leave the apparatus at a temperature of 220° C. The hot product is continuously mixed with 4 kg/h of a short-chain polyether polyol, the mixture having almost the same properties as a product of an analogous composition as shown in Example 5.

I claim:

1. A process for preparing polyol-containing dispersions by reacting waste from polyurethane-urea which has been prepared from aromatic diamines, reacted with high molecular polyether polyols with mol masses in the range of thousands of grams/mole, and aromatic di- or polyisocyanates based on methylene diphenyl diisocyanate, with at least one linear and/or branched-chain diol and/or polyol with a mol mass of 50–1000 g/mol in a ratio by weight of polymer waste to diol and/or polyol of greater than 3:1 at a temperature of 150°–250° C., optionally in the presence of acid or basic catalysts, and by dispersing the reaction product in at least one primary polyol with a mol mass up to about 6000 g/mol.

2. A process according to claim 1, characterized in that the ratio by weight of polymer waste to diol and/or polyol is more than 5:1.

3. A process according to claim 2, characterized in that aliphatic diols with up to 20 carbon atoms are used for the reaction.

4. A process according to claim 3, characterized in that primary polyols based on polyether and/or polyester polyols are used.

5. A process according to claim 4, characterized in that the dispersion operation is carried out such that directly after the completion of the reaction primary polyol is added and mixed with the reaction product which is still in its hot state.

6. A process according to claim 5, characterized in that polyurethane-urea waste which is composed of aromatic diisocyanates and polyether polyoldiethyl toluylene diamine is used.

7. A process according to claim 6, characterized in that RIM- and/or R-RIM production waste, possibly with paint and glass-fiber fillers, is used.

8. A process according to claim 7, characterized in that the reaction is carried out in the presence of an unsaturated carboxylic acid or the anhydride thereof.

9. A process according to claim 8, characterized in that the reaction is continuously carried out in a single- or two-stage stirring vessel system or in an extruder.

10. A process according to claim 1, characterized in that aliphatic diols with up to 20 carbon atoms are used for the reaction.

11. A process according to claim 1, characterized in that primary polyols based on polyether and/or polyester polyols are used.

12. A process according to claim 1, characterized in that the dispersion operation is carried out such that directly after the completion of the reaction primary polyol is added and mixed with the reaction product which is still in its hot state.

13. A process according to claim 1, characterized in that at least part of the primary polyol is already present or added during the reaction.

14. A process according to claim 1, characterized in that polyurethane-urea waste which is composed of aromatic diisocyanates and polyether polyol/diethyl toluylene diamine is used.

15. A process according to claim 1, characterized in that RIM- and/or R-RIM production waste, possibly with paint and glass-fiber fillers, is used.

16. A process according to claim 1, characterized in that the reaction is carried out in the presence of an unsaturated carboxylic acid or the anhydride thereof.

17. A process according to claim 1, characterized in that the reaction is continuously carried out in a single- or two-stage stirring vessel system or in an extruder.

18. In a method for preparing polyurethanes or polyurethane-ureas, the improvement comprising using as a starting polyol a polyol-containing dispersion as obtained in claim 1.

* * * * *